US010272985B2

(12) United States Patent
Marx et al.

(10) Patent No.: US 10,272,985 B2
(45) Date of Patent: Apr. 30, 2019

(54) EROSION RESISTANT FILMS FOR USE ON HEATED AERODYNAMIC SURFACES

(71) Applicant: 3M INNOVATIVE PROPERTIES COMPANY, St. Paul, MN (US)

(72) Inventors: Ryan E. Marx, Rosemount, MN (US); Bryan C. Feisel, Hudson, WI (US); Douglas E. Weiss, Overland Park, KS (US)

(73) Assignee: 3M Innovative Properties Company, St. Paul, MN (US)

( * ) Notice: Subject to any disclaimer, the term of this patent is extended or adjusted under 35 U.S.C. 154(b) by 332 days.

(21) Appl. No.: 15/150,130

(22) Filed: May 9, 2016

(65) Prior Publication Data

US 2016/0251072 A1  Sep. 1, 2016

Related U.S. Application Data

(60) Continuation of application No. 13/325,212, filed on Dec. 14, 2011, now abandoned, which is a division of
(Continued)

(51) Int. Cl.
*B64C 1/12* (2006.01)
*B64D 15/02* (2006.01)
(Continued)

(52) U.S. Cl.
CPC ................ *B64C 1/12* (2013.01); *B32B 37/12* (2013.01); *B64D 15/02* (2013.01); *B64D 15/12* (2013.01);
(Continued)

(58) Field of Classification Search
CPC ...... B32B 37/12; C09J 7/38; C09J 7/22; C09J 7/25; B64C 1/12
See application file for complete search history.

(56) References Cited

U.S. PATENT DOCUMENTS

| 2,964,422 A | 12/1960 | Bergstedt |
| 3,767,040 A | 10/1973 | Tushaus |

(Continued)

FOREIGN PATENT DOCUMENTS

| EP | 0 720 946 | 7/1995 |
| EP | 1 695 820 | 8/2006 |

(Continued)

OTHER PUBLICATIONS

Gent, ed., "*Engineering with Rubber: How to Design Rubber Components*", 2d ed. (Hanser Gardner 2001), 18 pages.
(Continued)

*Primary Examiner* — Daniel McNally
(74) *Attorney, Agent, or Firm* — Philip P. Soo

(57) ABSTRACT

The present disclosure provides a tape comprising: a) a single layer comprising a crosslinked polymer, selected from the group consisting of crosslinked polyurethane, crosslinked polyurea, and crosslinked mixed polyurethane/polyurea polymer, and b) an adhesive layer. In another embodiment, the tape comprises at least one layer comprising a semi-interpenetrating polymer network of a crosslinked acrylate and an uncrosslinked polymer selected from the group consisting of polyurethane, polyurea, and mixed polyurethane/polyurea polymer.

20 Claims, 1 Drawing Sheet

Related U.S. Application Data application No. 11/837,293, filed on Aug. 10, 2007, now Pat. No. 8,096,508.

(51) Int. Cl.

| | | |
|---|---|---|
| *B64D 15/12* | (2006.01) | |
| *C08G 18/08* | (2006.01) | |
| *C08G 18/42* | (2006.01) | |
| *C08G 18/66* | (2006.01) | |
| *C09J 133/08* | (2006.01) | |
| *B32B 37/12* | (2006.01) | |
| *C09J 7/38* | (2018.01) | |
| *C09J 7/22* | (2018.01) | |
| *C09J 7/25* | (2018.01) | |

(52) U.S. Cl.
CPC ..... *C08G 18/0895* (2013.01); *C08G 18/4277* (2013.01); *C08G 18/664* (2013.01); *C09J 7/22* (2018.01); *C09J 7/25* (2018.01); *C09J 7/38* (2018.01); *C09J 133/08* (2013.01); *B32B 2405/00* (2013.01); *B32B 2605/18* (2013.01); *C08G 2270/00* (2013.01); *C09J 2201/606* (2013.01); *C09J 2205/114* (2013.01); *C09J 2400/283* (2013.01); *C09J 2423/045* (2013.01); *C09J 2433/00* (2013.01); *C09J 2433/006* (2013.01); *C09J 2467/005* (2013.01); *C09J 2475/006* (2013.01); *Y10T 428/28* (2015.01)

(56) References Cited

U.S. PATENT DOCUMENTS

| | | | |
|---|---|---|---|
| 4,283,044 A | 8/1981 | McKibbin | |
| 4,329,384 A | 5/1982 | Vesley | |
| 4,330,590 A | 5/1982 | Vesley | |
| 4,562,234 A | 12/1985 | Besecke | |
| 4,741,499 A * | 5/1988 | Rudolph | B64D 15/04 244/134 B |
| 4,859,742 A | 8/1989 | Pattein | |
| 4,948,859 A * | 8/1990 | Echols | C08G 18/0895 264/211.23 |
| 5,544,845 A * | 8/1996 | Giamati | B64D 15/12 244/134 A |
| 5,605,937 A | 2/1997 | Knaus | |
| 5,709,948 A | 1/1998 | Perez | |
| 5,743,494 A | 4/1998 | Giamati | |
| 5,877,128 A | 3/1999 | Greer | |
| 5,934,617 A | 8/1999 | Rutherford | |
| 5,959,775 A | 9/1999 | Joseph | |
| 6,265,057 B1 | 7/2001 | Giamati | |
| 6,330,986 B1 * | 12/2001 | Rutherford | B64D 15/14 244/134 D |
| 6,352,601 B1 * | 3/2002 | Ray | B64D 15/00 156/71 |
| 6,489,024 B2 | 12/2002 | Griffith, Jr. | |
| 7,086,554 B2 | 8/2006 | Ehret | |
| 2003/0228465 A1 | 12/2003 | Coffey | |
| 2005/0147783 A1 | 7/2005 | Fisher | |
| 2005/0271881 A1 * | 12/2005 | Hong | B82Y 30/00 428/423.1 |
| 2006/0115613 A1 | 6/2006 | Dawe | |
| 2007/0231569 A1 | 10/2007 | Tanaka | |

FOREIGN PATENT DOCUMENTS

| | | |
|---|---|---|
| JP | H10-25464 | 1/1998 |
| WO | WO 1999/019414 | 4/1999 |
| WO | WO 2001/008973 | 2/2001 |
| WO | WO 2006/085054 | 8/2006 |
| WO | WO 2006/118883 | 11/2006 |

OTHER PUBLICATIONS

Hanselmann, "Elastomere Dokumentkennug RD-05-00596" *Römpp Online*, Jul. 1, 2007, pp. 1-2, XP055074581.

* cited by examiner

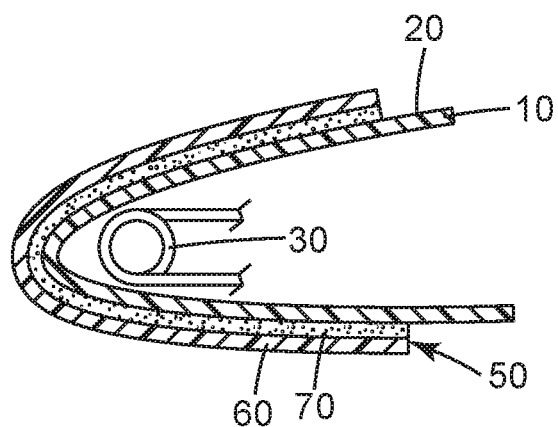

ately heated to at least 65° C., more typically at least 80° C., more typically at least 100° C., and more typically at least 120° C.

EROSION RESISTANT FILMS FOR USE ON HEATED AERODYNAMIC SURFACES

CROSS REFERENCE TO RELATED APPLICATIONS

This application is a continuation application of pending prior application Ser. No. 13/325,212, filed Dec. 14, 2011 which is a divisional application of application Ser. No. 11/837,293, filed Aug. 10, 2007, now issued as U.S. Pat. No. 8,096,508 on Jan. 17, 2012, the disclosures of which are incorporated by reference in their entirety herein.

FIELD OF THE DISCLOSURE

This invention relates to erosion resistant protective films which may be used on aerodynamic surfaces in conjunction with de-icing apparati.

BACKGROUND OF THE DISCLOSURE

U.S. Pat. No. 5,544,845 purportedly discloses an ice protection apparatus including a top polyurethane layer, an active layer, and a base layer cured together into a unitary matrix, wherein the base layer is either polyurethane or chloroprene.

U.S. Pat. App. No. 2005/271,881 purportedly discloses a method relating to abrasion resistant coatings which comprises disposing on a substrate one or more coatings, wherein one coating comprises an isocyanate-terminated polyurethane prepolymer and a curing agent; wherein the curing agents comprise polyaspartic esters, ketimines, aldimines, or a combination comprising at least one of the foregoing curing agents; reacting the isocyanate-terminated polyurethane prepolymer with a curing agent; wherein the reacting can optionally be carried out in the presence of moisture or heat; and curing the isocyanate-terminated polyurethane prepolymer to form the coating. The reference purportedly discloses use of the coating to protect certain aircraft surfaces.

SUMMARY OF THE INVENTION

Briefly, the present disclosure provides an erosion resistant construction comprising, first, an element of an aircraft comprising: an aircraft skin segment having an external surface, and a de-icing mechanism associated with said aircraft skin segment capable of heating said external surface to temperatures in excess of 65° C.; and, second, a tape comprising: at least one layer comprising a crosslinked elastomeric polymer, which may be a crosslinked polymer selected from the group consisting of crosslinked polyurethane, crosslinked polyurea, and crosslinked mixed polyurethane/polyurea polymer, and an adhesive layer; wherein the tape is bonded to the external surface of the aircraft skin segment by the adhesive layer. In one embodiment, the tape contains no uncrosslinked polymer other than the adhesive. The crosslinked polymer may additionally comprise an acrylate component. The crosslinked polymer may be a radiation crosslinked polymer. The crosslinked polymer may be an e-beam crosslinked polymer or a UV crosslinked polymer. The adhesive layer may comprise an acrylic adhesive. The external surface of the aircraft skin segment may include one or more layers of paint, primer, or both. The aircraft skin segment is typically a portion of an airplane wing or a portion of a helicopter rotor.

In another embodiment, the tape comprises at least one layer comprising a semi-interpenetrating polymer network of a crosslinked acrylate and an uncrosslinked polymer selected from the group consisting of polyurethane, polyurea, and mixed polyurethane/polyurea polymer.

In another embodiment, the disclosure provides a tape comprising: a) a single layer comprising a crosslinked polymer, selected from the group consisting of crosslinked polyurethane, crosslinked polyurea, and crosslinked mixed polyurethane/polyurea polymer, and b) an adhesive layer.

BRIEF DESCRIPTION OF THE DRAWINGS

FIG. 1 is a cross-sectional view of an element of an aircraft that includes an erosion resistant construction according to an exemplary embodiment.

DETAILED DESCRIPTION

The present disclosure provides an erosion resistant construction comprising, with reference to FIG. 1: first, an element of an aircraft comprising: an aircraft skin segment 10 having an external surface 20, and a de-icing mechanism 30 associated with said aircraft skin segment 10 capable of heating said external surface 20 to temperatures in excess of 65° C.; and, second, a tape 50 comprising: at least one layer 60 comprising a crosslinked elastomeric polymer such as a crosslinked polymer selected from the group consisting of crosslinked polyurethane, crosslinked polyurea, and crosslinked mixed polyurethane/polyurea polymer, and an adhesive layer 70; wherein the tape 50 is bonded to the external surface 20 of the aircraft skin segment 10 by the adhesive layer 70. The crosslinked polymer may additionally comprise an acrylate component. The crosslinked polymer may be a radiation crosslinked polymer. The crosslinked polymer may be an e-beam crosslinked polymer or a UV crosslinked polymer. The adhesive layer 70 may comprise an acrylic adhesive.

In a second embodiment, the tape comprises at least one layer comprising a semi-interpenetrating polymer network of a crosslinked acrylate and an uncrosslinked polymer selected from the group consisting of polyurethane and polyurea.

The aircraft skin segment may be any external segment associated with a de-icing mechanism, and is typically a portion of an airplane wing or a portion of a helicopter rotor. The skin segment and the external surface thereof may be of any suitable materials, including metals, composites, and the like. In some embodiments, the external surface of the aircraft skin segment may include one or more layers of paint, primer, or both. In such embodiments, the external surface of the aircraft skin segment typically includes one or more layers of primer topped with one or more layers of paint, which may include original manufacture layers or re-priming or re-paining layers or combinations thereof. In other embodiments, the external surface of the aircraft skin segment may be unpainted metal or composite material.

The de-icing mechanism may be any suitable mechanism capable of heating said external surface to temperatures in excess of 65° C., more typically in excess of 80° C., more typically in excess of 100° C., and more typically in excess of 120° C. Typical mechanisms may include electrically powered mechanisms, such as resistance heaters or radiative heaters, or mechanisms including conduits conducting re-directed jet exhaust.

Typically, the tape can remain substantially without blisters after one cycle of the following test: humidification in a humidity chamber at 45° C. and 95% RH for 7 hours, followed by heating to a temperature of 123° C. for a duration of 5 minutes, followed by cooling to 25° C. More typically the tape can remain substantially without blisters after ten cycles, and more typically one hundred cycles.

In some embodiments the tape comprises a crosslinked elastomeric polymer. Any suitable crosslinked elastomeric polymer may be used, which may include rubbers, natural rubbers, butyl rubbers, polyisoprenes, polybutadienes, SBR's, NBR's, HNBR's, EPM rubbers, EPDM rubbers, fluoroelastomers, silicones, polysulfide rubbers, chlorosulfonated polyethylenes, chlorinated polyethylenes, polyurethanes, polyureas, and the like, or mixtures thereof. Additional crosslinked elastomeric polymers which may be useful may be disclosed in Gent, ed., *Engineering with Rubber: How to Design Rubber Components,* 2d ed. (Hanser Gardner 2001).

In some embodiments, the tape comprises at least one layer comprising a crosslinked polymer selected from the group consisting of crosslinked polyurethane, crosslinked polyurea, and crosslinked mixed polyurethane/polyurea polymer and an adhesive layer. Any suitable crosslinked polyurethane or crosslinked polyurea may be used. Suitable polyurethanes may include polymers of polyisocyanates and polyols. Suitable polyureas may include polymers of polyisocyanates and polyamines. In some embodiments, the crosslinked polymer may be a mixed polyurethane/polyurea polymer derived from polyisocyanates and a mixture of polyols and polyamines. Any suitable polyisocyanates, polyols or polyamines may be used. Suitable polyisocyanates may include aromatic isocyanates, aliphatic isocyanates, polyisocyanates, or combinations thereof. Suitable aromatic isocyanates may include Methylene diphenyl diisocyanate, 1,4-Phenylene diisocyanate, 1,3-Phenylene diisocyanate, 3,3'-Dimethyl diphenylmethane-4,4'-diisocyanate, Diphenylmethane-2,2'-diisocyanate, naphthalene diisocyanate, 4,4'-Biphenyldiisocyanate, 1,5-Naphthalene Diisocyanate, 2-Methyl-1,5-naphthalene diisocyanate, 2,4-toluene diisocyanate and 2,6-toluene diisocyanate and mixtures of the two isomers, diphenylmethane-2,4'-diisocyanate, 4-Ethylm-phenylenediisocyanate, and the like, or mixtures thereof. Suitable aliphatic isocyanates may include 2,4,4-Trimethylhexamethylene diisocyanate, 2,2,4-Trimethylhexamethylene diisocyanate, 1,4-Cyclohexane diisocyanate, 1,3-cyclohexyl diisocyanate, Trimethylhexamethylene diisocyanate, Isophorone Diisocyanate (IPDI), Decamethylene diisocyanate, Methylene diisocyanate, Methylene-bis(4-Cyclohexylisocyanate) (H12MDI), dimeryl diisocyanate, trans-1,4-Cyclohexane diisocyanate, hexamethylene diisocyanate, and the like, or mixtures thereof. Other suitable isocyanates may include polyisocyanates, including those based on any of the above. Suitable polyols may include polyester polyols, polycaprolactone polyols, polyether polyols, hydroxyl terminated polybutadiene and hydrogenated polybutadiene polyols, polycarbonate polyols, and the like, or mixtures thereof. Suitable polyamines may include JEFFAMINE® polyetheramines and the like, or mixtures thereof. In addition, chain extenders may be included, which are typically monomeric or low molecular weight difunctional compounds. Suitable hydroxy chain extenders may include ethylene glycol, diethylene glycol, propylene glycol, dipropylene glycol, neopentyl glycol, 1,4 butanediol, and 2-methyl-1,3-propylenediol and the like, or mixtures thereof. Suitable amino chain extenders may include 1,4 diaminobutane, Ethylenediamine, 1,2 diaminopropane, 1,3 diaminopropane, 1,2 diaminocyclohexane, isophorone diamine, secondary cycloaliphatic diamines, diethyltoluenediamine, and the like, or mixtures thereof.

In one embodiment, the crosslinked polymer may additionally comprise an acrylate component. The acrylate component is derived from any suitable acrylate component precursor, which is any suitable monomer, oligomer or polymer with an acrylate double bond available for polymerization. In some embodiments, acrylate component precursors are crosslinked by e-beam or other radiation during formation of the tape to form the acrylate component ultimately present in the finished tape.

In one embodiment, the acrylate component precursor is copolymerized into the polyurethane or polyurea prior to crosslinking of the acrylate component precursor. Suitable acrylates of this type, such as SR495B used in the Examples below, include one or more groups which polymerize with the polyurethane or polyurea, such as alcohol or amine groups, and one or more acrylate double bonds available for polymerization. Other suitable species may include caprolactone acrylates, hydroxyethyl acrylate, dipentaerythritol pentaacrylate, and the like, or mixtures thereof.

In one embodiment, the acrylate component precursor is blended with the polyurethane or polyurea prior to crosslinking of the acrylate component precursor. In this embodiment, the polyurethane or polyurea form an interpenetrating polymer network or semi-interpenetrating polymer network with the crosslinked acrylate component in the final tape. An interpenetrating polymer network is formed where both the acrylate component and the polyurethane or polyurea are crosslinked. A semi-interpenetrating polymer network is formed where the acrylate component is crosslinked and the polyurethane or polyurea are not. Suitable acrylates of this type include CN996, used in the Examples below. Suitable acrylates of this type are typically at least partially miscible in the polyurethane or polyurea.

The crosslinked polymer may be crosslinked by any suitable means, including radiation crosslinking, such as by e-beam, UV, visible light, IR, and the like, or covalent crosslinking achieved by the inclusion of crosslinking agents or polyfunctional monomers in the polymer during manufacture. Polyfunctional monomers may include polyisocyanates, polyols, polyamines, and the like, or mixtures thereof.

In one embodiment, the tape contains no uncrosslinked polymer other than the adhesive. In one embodiment, the tape contains no polymer layer other than the adhesive that does not contain crosslinked polymer.

The tape is typically transparent or translucent but may also be pigmented. The tape may have any suitable thickness. Typical thickness is between 0.01 mm and 3.0 mm, more typically between 0.01 mm and 1.0 mm, more typically between 0.1 mm and 1.0 mm, more typically between 0.25 mm and 1.0 mm, and more typically between 0.25 mm and 0.75 mm.

Any suitable adhesive layer may be used. In one embodiment, the adhesive layer may comprise an acrylic adhesive. In one embodiment, the adhesive is a pressure-sensitive adhesive. Suitable adhesives may include acrylics, polyurethanes, silicones, styrene-butadiene block copolymers, styrene-isoprene block copolymers, and the like.

The tape may be made by any suitable method, including those demonstrated in the Examples below. Suitable methods may include blending of polyurethane or polyurea with an acrylate (e.g., Ex. 1), reactive extrusion (e.g., Exs. 2-4), or reactive coating (e.g., Exs. 5 and 6).

This invention is useful, e.g., in the design, manufacture and maintenance of aircraft, e.g., to provide erosion resistance on aircraft that utilize an internal de-icing system.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods. Table I describes materials used in the examples.

TABLE I

| Material | Description |
|---|---|
| H12MDI | Dicyclohexylmethane-4,4'-Diisocyanate available commercially as Desmodur W ® from Bayer, Pittsburgh, PA |
| TONE ™ 2221 | 1000 Mw neopentyl glycol initiated linear caprolactone diol available from Dow, Midland, MI |
| TONE ™ 2241 | 2000 Mw neopentyl glycol initiated linear caprolactone diol available from Dow, Midland, MI |
| BDO | 1,4 Butanediol, available from Sigma Aldrich Corp., St. Louis, MO. |
| CAPA ® 3091 | A polyester triol terminated by primary hydroxyl groups having a molecular weight of 900 available from Solvay Caprolactones, Warrington, Cheshire, United Kingdom |
| DBTDL | Dibutyltindilaurate catalyst available commercially as Dabco ® T-12 from Air Products, Allentown, PA |
| SR495B | SR495B caprolactone acrylate, M.W. 344, available from Sartomer, Exton, PA |
| CN996 | Aliphatic urethane acrylate oligomer available from Sartomer, Exton, PA |
| Tinuvin ® 292 | Hindered-amine light stabilizer available from Ciba Specialty Chemicals, Tarrytown, NY |
| Tinuvin ® 1130 | UV absorber of the hydroxyphenylbenzotriazole class available from Ciba Specialty Chemicals, Tarrytown, NY |
| D-2000 | JEFFAMINE ® D-2000 Polyetherdiamine, M.W. about 2000, available from Huntsman Corp., The Woodlands, TX |
| T-5000 | JEFFAMINE ® T-5000 Polyethertriamine, M.W. about 5000, available from Huntsman Corp., The Woodlands, TX |
| Gray Pigment | Gray polyurethane concentrate, available from Americhem, Inc., Cuyahoga Falls, OH |
| Transfer Tape 965 | Adhesive Transfer Tape 965 commercially available from 3M Company, St. Paul, MN |
| PPT 8681 HS | 0.014" thick gray Polyurethane Protective Tape with 0.002" of a high shear pressure sensitive acrylic adhesive available from 3M Company, St. Paul, MN |
| PPT 8673 | 0.014" thick Polyurethane Protective Tape with 0.002" of a pressure sensitive acrylic adhesive available from 3M Company, St. Paul, MN |
| PPT 8667 HS | 0.028" thick gray Polyurethane Protective Tape with 0.003" of a high shear pressure sensitive acrylic adhesive available from 3M Company, St. Paul, MN |
| Krystalgran ® | Krystalgran ® PN3429-108, an aliphatic thermoplastic polyurethane based on polyester available from Huntsman Chemical, The Woodlands, TX |

Films were made by extrusion, reactive extrusion or reactive coating, as described following. Some films were further treated with e-beam irradiation, as described following.

Extrusion and Reactive Extrusion

Examples 1, 2, 3 and 4, were made using a 25 mm co-rotating Berstorff model ZE25 twin screw extruder (available from Berstorff USA, Florence, Ky.). The extruder contained 10 barrel zones, each independently heated. A melt pump was used at the end of the extruder to feed the polymer melt into a 12" (30.5 cm) coat hanger die available from Extrusion Dies, Inc Chippewa Falls, Wis. The die had a 0.050" (1.27 mm) nominal die opening with an adjustable lip. The films extruded through the film die were then cast onto non-stick non-silicone non-fluoropolymer paper liner supported by a casting roll. Film caliper was controlled by die bolts within the die and by maintenance of wind up speed.

In Example 1, a polyurethane and a urethane acrylate oligomer were mixed in the extruder and extruded together to form a film. In Examples 2, 3 and 4, monomers were fed into the extruder and polymerization took place in the extruder, allowing a polymer melt to be extruded out the end. In Examples 2, 3 and 4, there were at least two monomer feeds: an isocyanate (Desmodur W) and a polyol batch.

The extrusion process conditions are shown below in Table II.

TABLE II

| Process Condition | Settings for Ex. 1 | Settings for Ex. 2 | Settings for Ex. 3 | Settings for Ex. 4 |
|---|---|---|---|---|
| Extruder RPM | 100 | 150 | 150 | 150 |
| Extruder Amps | 40% | 15% | 20% | 25% |
| Tempered Water (° C.) | 15 | 15 | 15 | 15 |
| Zone 2 (° C.) | 160 | 160 | 160 | 160 |
| Zone 3 (° C.) | 165 | 165 | 165 | 165 |
| Zone 4 (° C.) | 170 | 170 | 170 | 170 |
| Zone 5 (° C.) | 170 | 170 | 170 | 170 |
| Zone 6 (° C.) | 170 | 170 | 170 | 170 |
| Zone 7 (° C.) | 170 | 175 | 175 | 175 |
| Zone 8 (° C.) | 170 | 175 | 175 | 175 |

TABLE II-continued

| Process Condition | Settings for Ex. 1 | Settings for Ex. 2 | Settings for Ex. 3 | Settings for Ex. 4 |
|---|---|---|---|---|
| Zone 9 (° C.) | 170 | 175 | 175 | 175 |
| Zone 10 (° C.) | 170 | 175 | 175 | 175 |
| Die Zone (° F.) (outside) | 370 | 375 | 356 | 385 |
| Die Zone (° F.) (middle) | 370 | 356 | 370 | 356 |
| Die Zone (° F.) (outside) | 370 | 375 | 356 | 375 |
| Neck Tube (° F.) | 345 | 356 | 356 | 356 |
| Melt pump rpm | 22 | 16.7 | 16.4 | 22.1 |
| Melt pump in (psi) | 80 | 75 | 330 | 50 |
| Melt pump out (psi) | 1200 | 20 | 330 | 1160 |
| Casting Roll (° F.) | 120 | 140 | 120 | off |
| Winder (ft/min) | 2.2 | | 2.18 | 2.2 |

For Example 1, polyurethane flake was fed into zone 2 using a gravimetric feeder equipped with double spiral screws, available under the trade designation "K-Tron gravimetric feeder, model K-CL-SFS-KT20" from K-Tron International, Pitman, N.J. Grey Pigment was fed into zone 2 using a second K-Tron gravimetric feeder. The urethane acrylate oligomer was heated to 55° C. in an electrically heated vessel and fed into zone 3 at 55° C. with a Zenith® gear pump, available from Zenith® Pumps, Monroe, N.C.

For Examples 2, 3 and 4 the isocyanate (Desmodur W) and the polyol batch were both fed into zone 3 of the extruder. Desmodur W was fed to the extruder with a Zenith® gear pump, available from Zenith® Pumps, Monroe, N.C. The polyol solution was mixed prior to feeding. The polyol solution was heated to 55° C. in an electrically heated vessel and fed at 55° C. with a Zenith® gear pump, available from Zenith® Pumps, Monroe, N.C. Grey Pigment was fed into zone 2 using a K-Tron gravimetric feeder.

Reactive Coating

Examples 5 and 6 demonstrate reactive coating. In reactive coating, monomers were mixed and coated between two non-stick non-silicone non-fluoropolymer release liners. The monomers were then thermally cured to create polymeric films. The polyol or polyamine monomers were premixed, optionally with catalyst, in a 25 ml polyethylene cup. To this mixture, the isocyanate (Desmodur W) was added and mixed. This reactive mixture was then immediately poured onto a 2 or 4 mil (0.05 or 0.10 mm) thick release liner. An additional release liner was placed on top of the reactive mixture, creating a sandwich structure. This construct was then pulled under a coating knife set at a pre-determined depth to create a film of uniform thickness and then heated to 70° C. for 1 hour to cure.

E-Beam Crosslinking

The films of Examples 1, 2 and 3 were crosslinked via e-beam irradiation using an ESI 'Electrocurtain' CB-300 operated at a maximum accelerating voltage of 300 keV and at a sufficient current to deliver a dose of 20 kGy in a single pass.

Determination of Successful Crosslinking

To determine whether films had been successfully crosslinked, samples were exposed to a heat gun. Those which did not readily melt were said to be successfully crosslinked. In particular, those which had been e-beam irradiated and did not readily melt, wherein non-irradiated samples of the same film did melt, were said to be crosslinked.

Blister Determination Test

Three inch by eight inch aluminum panels were prepared by painting with Deft 02-Y-40A (spec MIL-PRF-23377j) epoxy primer followed by Deft 99-GY-001 (spec MIL-PRF-85285D) military gray paint. Applied to a painted panel were one 3"×3" (7.6 cm×7.6 cm) square of the Example tape to be tested and a 3"×3" (7.6 cm×7.6 cm) square of a comparative tape selected from: PPT 8681 HS, PPT 8673 and PPT 8667 HS. The panels were left at ambient conditions for 24 hours and then conditioned in a humidity chamber at 45° C. and 95% RH for 7 hours. The panels were removed from the humidity chamber and immediately placed on a hot plate set to 125° C. The samples were heated for 5 minutes and then removed.

Example 1

The film of Example 1 was made by extrusion. Krystalgran polyurethane pellets and CN996 were blended, extruded and formed into a film of 26 mil (0.66 mm) nominal thickness onto a polyethylene coated paper liner. The material flow rates into the extruder were: polyurethane 12.0 lb/hr, gray pigment 0.5 lb/hr, CN996 1.0 lb/hr. The films were then e-beam irradiated at 16 Mrad on the open face and then irradiated through the paper liner at 4 Mrad, both at a rate of 22 ft/min. The film was determined to be crosslinked.

The film of Example 1 was corona treated, coated with a 90/10 isooctyl acrylate/acrylic acid monomer mixture with photoinitiator at a coating thickness of 3 mil (0.076 mm), and then UV cured to form a pressure sensitive acrylic adhesive. (This adhesive is described in U.S. Pat. Nos. 4,329,384 and 4,330,590, the disclosures of which are incorporated herein by reference.) The tape was then subjected to the Blister Determination Test in comparison with PPT 8667 HS. The tape of Example 1 exhibited no blistering and the surface remained unchanged, while the sample of PPT 8667 HS blistered and became slightly glossier.

Example 2

The film of Example 2 was made by reactive extrusion. The composition of the polyol solution used in Example 2 is shown in Table III. The feed rates and pump settings for both the isocyanate and the polyol solution are shown in Table IV. The polymer was extruded as a film of 30 mil (0.76 mm) nominal thickness onto a polyethylene coated paper liner.

TABLE III

| Ex. | Tone 2221 (g) | Tone 2241 (g) | CAPA 3091 (g) | SR 495B (g) | BDO (g) | DBTDL (g) | Tinuvin 292 (g) | Tinuvin 1130 (g) |
|---|---|---|---|---|---|---|---|---|
| 2 | 0.0 | 2738.0 | 32.9 | 109.5 | 547.6 | 3.4 | 34.3 | 34.3 |
| 3 | 2714.2 | 0.0 | 84.1 | 114.0 | 515.7 | 3.4 | 34.3 | 34.3 |
| 4 | 2844.8 | 0.0 | 102.4 | 0.0 | 480.8 | 3.4 | 34.3 | 34.3 |

TABLE IV

| Ex. | H12MDI Pump Setting (rpm) | H12MDI (g/min) | Polyol Pump Setting (rpm) | Polyol (g/min) | Gray Pigment (g/min) |
|---|---|---|---|---|---|
| 2 | 109.5 | 33.6 | 45.2 | 57.2 | 3.8 |
| 3 | 118.9 | 36.4 | 42.5 | 54.3 | 3.8 |
| 4 | 144 | 44.3 | 54.5 | 69.2 | 3.8 |

The film of Example 2 was e-beam irradiated at 10 Mrad on the open face and then irradiated through the paper liner at 2 Mrad, both at a rate of 22 ft/min. The film was determined to be crosslinked.

The film of Example 2 was corona treated, coated with a 90/10 isooctyl acrylate/acrylic acid monomer mixture with photoinitiator at a coating thickness of 3 mil (0.076 mm), and then UV cured to form a pressure sensitive acrylic adhesive. The tape was then subjected to the Blister Determination Test in comparison with PPT 8667 HS. The tape of Example 2 exhibited no blistering and the surface remained unchanged, while the sample of PPT 8667 HS blistered and became slightly glossier.

Example 3

The film of Example 3 was made by reactive extrusion. The composition of the polyol solution used in Example 3 is shown in Table III. The feed rates and pump settings for both the isocyanate and the polyol solution are shown in Table IV. The polymer was extruded as a film of 25 mil (0.64 mm) nominal thickness onto a polyethylene coated paper liner.

The film of Example 3 was e-beam irradiated at 4 Mrad at a rate of 22 ft/min on the open face only. The film was determined to be crosslinked.

The film of Example 3 was corona treated, coated with a 90/10 isooctyl acrylate/acrylic acid monomer mixture with photoinitiator at a coating thickness of 3 mil (0.076 mm), and then UV cured to form a pressure sensitive acrylic adhesive. The tape was then subjected to the Blister Determination Test in comparison with PPT 8667 HS. The tape of Example 3 exhibited no blistering and the surface remained unchanged, while the sample of PPT 8667 HS blistered and became slightly glossier.

Example 4

The film of Example 4 was made by reactive extrusion. The composition of the polyol solution used in Example 4 is shown in Table III. The feed rates and pump settings for both the isocyanate and the polyol solution are shown in Table IV. The polymer was extruded as a film of 35 mil (0.89 mm) nominal thickness onto a polyethylene coated paper liner.

The film of Example 4 was not e-beam irradiated. One week after film formation the film was determined to be crosslinked.

The film of Example 4 was corona treated, coated with a 90/10 isooctyl acrylate/acrylic acid monomer mixture with photoinitiator at a coating thickness of 3 mil (0.076 mm), and then UV cured to form a pressure sensitive acrylic adhesive. The tape was then subjected to the Blister Determination Test in comparison with PPT 8667 HS. The tape of Example 4 exhibited no blistering and the surface remained unchanged, while the sample of PPT 8667 HS blistered and became slightly glossier.

Example 5

The film of Example 5 was made by reactive coating using a 2 mil (0.05 mm) thick non-stick non-silicone non-fluoropolymer PET release liner to make a 6 mil (0.15 mm) thick film. The composition used is shown in Table V.

TABLE V

| H12MDI (g) | Tone 2221 (g) | Gray Pigment (g) | Capa 3091 (g) | BDO (g) | DBTDL (g) |
|---|---|---|---|---|---|
| 4.10 | 4.39 | 0.49 | 0.29 | 0.94 | 0.01 |

The film of Example 5 was not e-beam irradiated. 24 hours after film formation the film was determined to be crosslinked.

To add adhesive to the film of Example 5, the film was corona treated, laminated with Transfer Tape 965, and then the transfer tape backing was removed leaving behind adhesive laminated to the film. The resulting tape was then subjected to the Blister Determination Test in comparison with PPT 8681 HS. The tape of Example 5 exhibited no blistering and the surface remained unchanged, while the sample of PPT 8681 HS blistered and became slightly glossier.

Example 6

The film of Example 6 was made by reactive coating using a 4 mil (0.10 mm) thick linear low density polyethylene release liner to make a 10 mil (0.25 mm) thick film. The composition used is shown in Table VI.

TABLE VI

| H12MDI (g) | D-2000 (g) | T-5000 (g) | Ethacure 100-LC (g) |
|---|---|---|---|
| 4.46 | 10.00 | 1.60 | 2.00 |

The film of Example 6 was not e-beam irradiated. Twenty-four hours after film formation the film was determined to be crosslinked.

To add adhesive to the film of Example 6, the film was corona treated, laminated with Transfer Tape 965, and then the transfer tape backing was removed leaving behind adhesive laminated to the film. The resulting tape was then subjected to the Blister Determination Test in comparison with PPT 8673. The tape of Example 5 exhibited no blistering and the surface remained unchanged, while the sample of PPT 8673 blistered.

Various modifications and alterations of this invention will become apparent to those skilled in the art without departing from the scope and principles of this invention, and it should be understood that this invention is not to be unduly limited to the illustrative embodiments set forth hereinabove.

We claim:
1. A method of providing erosion resistance on aircraft, the method comprising:
 a) providing an aircraft element comprising:
  i) an aircraft skin segment having an external surface, and
  ii) an internal de-icing mechanism associated with said aircraft skin segment capable of heating said external surface to temperatures in excess of 65° C.;
 b) bonding to the aircraft element a tape comprising:
  i) at least one layer comprising a crosslinked polymer, selected from the group consisting of crosslinked polyurethane, crosslinked polyurea, and crosslinked mixed polyurethane/polyurea polymer, and ii) an adhesive layer, wherein the tape is bonded to the external surface of the aircraft skin segment by the adhesive layer.

2. The method according to claim 1, wherein the crosslinked polymer is blended with at least one acrylate component.

3. The method according to claim 2, wherein the acrylate component is derived from an acrylate component precursor copolymerized into the polyurethane or polyurea prior to crosslinking of the acrylate component precursor.

4. The method of claim 3, wherein the acrylate component is formed by crosslinking the acrylate component precursor by e-beam or other radiation.

5. The method according to claim 3, wherein the acrylate component precursor comprises caprolactone acrylate, hydroxyethyl acrylate, dipentaerythritol pentaacrylate, or mixture thereof.

6. The method according to claim 1, wherein said at least one layer comprising a crosslinked polymer is a single layer consisting essentially of crosslinked polyurethane.

7. The method according to claim 6, wherein said at least one layer comprising a crosslinked polymer is a single layer consisting essentially of crosslinked polyurethane which incorporates at least one acrylate component.

8. The method according to claim 1, wherein said at least one layer comprising a crosslinked polymer is a single layer consisting essentially of crosslinked polyurea.

9. The method according to claim 8, wherein said at least one layer comprising a crosslinked polymer is a single layer consisting essentially of crosslinked polyurea which incorporates at least one acrylate component.

10. The method according to claim 1, wherein the adhesive is a pressure-sensitive adhesive.

11. The method according to claim 10, wherein the pressure-sensitive adhesive comprises an acrylic, polyurethane, silicone, styrene-butadiene block copolymer, or styrene-isoprene block copolymer.

12. The method according to claim 1, wherein the tape comprises no uncrosslinked polymer layer other than the adhesive layer.

13. The method according to claim 1, wherein the tape comprises no uncrosslinked polymer other than the adhesive layer.

14. The method according to claim 1, wherein the crosslinked polymer incorporates at least one acrylate component.

15. The method according to claim 1, wherein the crosslinked polymer is a crosslinked polyurethane.

16. The method according to claim 1, wherein the crosslinked polymer is a crosslinked polyurea.

17. The method according to claim 1, wherein the external surface of the aircraft skin segment includes one or more layers of paint and/or primer.

18. The method according to claim 1, wherein the crosslinked polymer is elastomeric.

19. The method according to claim 1, wherein the tape is made by reactive extrusion, reactive coating, or blending the polyurethane or polyurea with an acrylate.

20. An erosion resistant aircraft construction made from the method according to claim 1.

* * * * *